| (12) | United States Patent | (10) Patent No.: US 11,695,264 B2 |
|---|---|---|
| | Kandin | (45) Date of Patent: Jul. 4, 2023 |

(54) DEVICE FOR WINDING A FLEXIBLE TUBE

(71) Applicant: Patrice Kandin, Meyrargues (FR)

(72) Inventor: Patrice Kandin, Meyrargues (FR)

( * ) Notice: Subject to any disclaimer, the term of this patent is extended or adjusted under 35 U.S.C. 154(b) by 608 days.

(21) Appl. No.: 16/628,543

(22) PCT Filed: Jul. 4, 2018

(86) PCT No.: PCT/FR2018/000189
§ 371 (c)(1),
(2) Date: Jan. 3, 2020

(87) PCT Pub. No.: WO2019/008240
PCT Pub. Date: Jan. 10, 2019

(65) Prior Publication Data
US 2020/0216287 A1     Jul. 9, 2020

(30) Foreign Application Priority Data
Jul. 5, 2017 (FR) ..................... 17/70715

(51) Int. Cl.
*F16G 11/14* (2006.01)
*H02G 11/02* (2006.01)
*B65H 75/36* (2006.01)
*B65H 75/40* (2006.01)
*B65H 75/06* (2006.01)

(52) U.S. Cl.
CPC ............. *H02G 11/02* (2013.01); *B65H 75/06* (2013.01); *B65H 75/36* (2013.01); *B65H 75/40* (2013.01); *B65H 75/406* (2013.01); *F16G 11/14* (2013.01); *Y10T 24/39* (2015.01); *Y10T 24/3936* (2015.01)

(58) Field of Classification Search
CPC ......... Y10T 24/44026; Y10T 24/45005; Y10T 24/44043; Y10T 24/45293; Y10T 24/3936; F16B 45/06; F16G 11/14
See application file for complete search history.

(56) References Cited

U.S. PATENT DOCUMENTS

| 321,554 A | 7/1885 | Waterhouse |
| 1,519,018 A | 12/1924 | Boudreau |
| 2,011,521 A | 8/1935 | Lorenz |
| (Continued) | | |

FOREIGN PATENT DOCUMENTS

| DE | 43 11 071 A1 | 10/1994 |
| JP | 2007-126931 A | 5/2007 |

OTHER PUBLICATIONS

International Search Report for PCT/FR2018/000189 dated Dec. 14, 2018.

*Primary Examiner* — Robert Sandy
(74) *Attorney, Agent, or Firm* — Sughrue Mion, PLLC

(57) ABSTRACT

A device for winding a flexible tube, the device including two identical blades LA placed opposite ways round one against the other and pivotally secured to each other about their respective axes of axial symmetry, which together constitute a pivot axis PIV. One of the blades presents in its left edge an upwardly open notch EC that is formed by a first circular arc ARC1 having its origin at a connection point PR situated on the right edge of the notch and on the longitudinal axis LG of the blade; a diameter of the first circular arc lying on the longitudinal axis; and the first circular arc presenting a central angle α of not less than 180°.

10 Claims, 1 Drawing Sheet

(56) References Cited

U.S. PATENT DOCUMENTS

| | | | | |
|---|---|---|---|---|
| 4,290,637 A | * | 9/1981 | Fischer | B64D 17/38 |
| | | | | 294/82.32 |
| 5,560,564 A | | 10/1996 | Maynard | |
| 7,841,571 B1 | * | 11/2010 | Ghormley | F16L 11/122 |
| | | | | 24/598.5 |
| 10,111,545 B1 | * | 10/2018 | Shapiro | F16G 11/143 |
| 2007/0157438 A1 | | 7/2007 | Judd | |

* cited by examiner

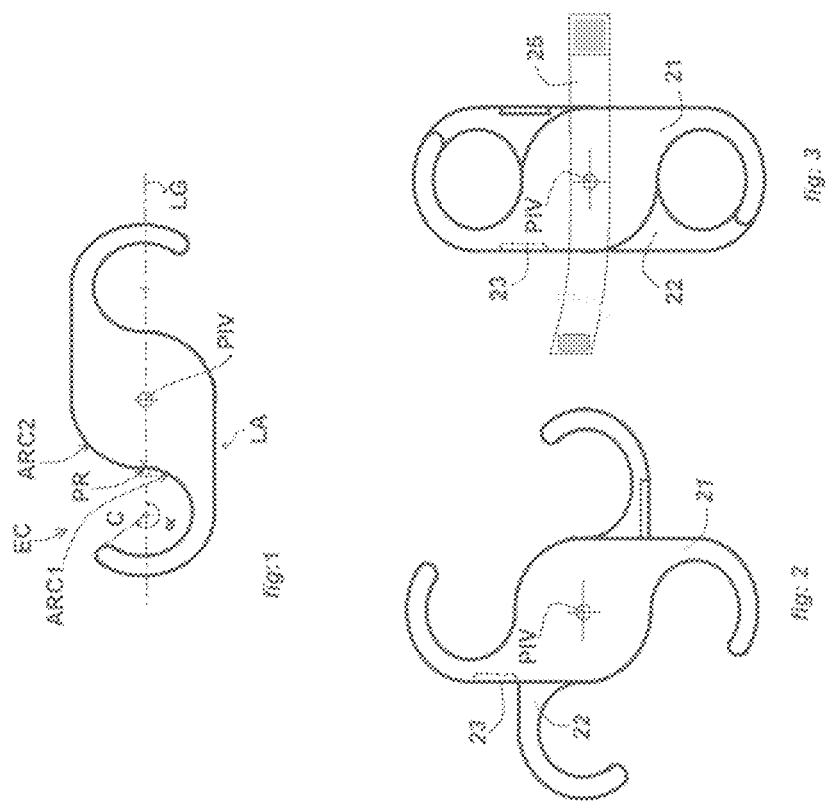

DEVICE FOR WINDING A FLEXIBLE TUBE

CROSS REFERENCE TO RELATED APPLICATIONS

This application is a National Stage of International Application No. PCT/FR2018/000189 filed Jul. 4, 2018, claiming priority based on French Patent Application No. 17/70715, filed Jul. 5, 2017.

The present invention relates to a device for winding a flexible tube. By way of example, the term "flexible tube" is used to cover pipes, cords, electric wires, or cables.

In general, difficulties are encountered when winding garden hoses, swimming pool suction pipes, or electric cables, since they twist, curl in all directions, and thus degrade quickly. It is very awkward to wind them in satisfactory manner.

The present invention thus seeks to facilitate winding a flexible tube.

According to the invention, a device for winding a flexible tube comprises two identical blades placed opposite ways round one against the other and pivotally secured to each other about their respective axes of axial symmetry, which together constitute a pivot axis; and in addition:
one of the blades presents in its left edge an upwardly open notch that is formed by a first circular arc having its origin at a connection point situated on the right edge of the notch and on the longitudinal axis of the blade;
a diameter of the first circular arc lies on the longitudinal axis; and
the first circular arc presents a central angle of not less than 180°.

Thus, a first loop is formed in the pipe, which therefore presents two strands. The device is opened so as to insert the two strands in corresponding notches. Finally, the device is closed so as to hold captive the two strands, which are thus prevented from moving. It then suffices to turn the loop in order to wind the pipe.

Advantageously, the notch projects upwards from the connection point following a second circular arc having the same diameter as the first circular arc and tangential to the first circular arc at the connection point, the center of the second circular arc lying on the longitudinal axis, to the right of the connection point.

By proceeding in this way, it is possible to ensure that the circle formed by the two blades is not obstructed under any circumstances when the device is maneuvered.

Preferably, the central angle of the first circular arc lies in the range 180° to 230°.

It is preferable for the central angle to exceed 180° in order to pinch the pipe a little while it is being inserted into the device.

By way of example, the central angle is equal to 225°.

In a preferred embodiment, a spacer is arranged on the pivot axis between the two blades.

For greater convenience, holder means are provided that are fastened to the pivot axis.

Finally, an abutment may be provided on one of the blades, which abutment is perpendicular to the blade.

The present invention appears below in greater detail in the following description of an embodiment given by way of illustration and with reference to the accompanying figures, in which:

FIG. 1 is a diagram of a blade of the invention;
FIG. 2 is a diagram of the device when open; and
FIG. 3 is a diagram of the device when closed.

Elements present in more than one of the figures are given the same references in each of them.

With reference to FIG. 1, a blade LA is in the form of an elongate plate of rectangular shape with short sides that are rounded, the plate presenting a longitudinal axis LG. It presents axial symmetry about its center PIV, which forms a pivot axis.

The blade LA has an upwardly open notch EC in its left edge. A connection point PR is defined as the point of intersection between the right edge of the notch EC and the longitudinal axis LG.

This notch is in the form of a first circular arc ARC1 having its origin at the connection point PR and extending in the clockwise direction, it being understood that the center C of this circular arc ARC1 is to the left of the connection point PR and on the longitudinal axis LG.

The first circular arc ARC1 presents a central angle written α. This central angle α is not less than 180°. In practice, it exceeds this value and may be as much as 230°. Typically, it is about 225°.

The notch EC continues upwards, preferably by a second circular arc ARC2 having its origin at the connection point PR.

This second circular arc ARC2 has its center appearing to the right of the connection point PR and on the longitudinal axis LG. It has the same diameter as the first circular arc ARC1 and it extends clockwise from its origin PR. It terminates when it meets the top edge of the blade LA.

Specifically, this particular shape for the notch serves to avoid obstructing the first circular arc ARC1, as explained below.

The notch EC may be of some other shape to the right of the connection point, providing it projects from the second circular arc ARC2.

It should be observed that the two circular arcs ARC1 and ARC2 are tangential at the connection point PR along a straight line that is vertical in the figure.

The blade LA presents axial symmetry along the pivot axis PIV. It thus presents another notch that is opposite and in the right edge of the blade LA. This other notch is not described in further detail since it is symmetrical.

With reference to FIG. 2, two blades, a top blade 21 and a bottom blade 22 are assembled together opposite ways round about their pivot axis PIV, which they have in common. The assembly means (not shown) may be a bolt, a flattened pin, a rivet, or any other analogous means known to the person skilled in the art.

On the first blade 21, there can be seen an abutment 23 that projects rearwards and that is thus perpendicular to the blade. This blade has two functions:
it makes it easier to take hold of the device in the hand; and
it limits turning of the two blades 21 and 22 relative to each other.

A spacer (not shown) may optionally be provided between the two blades 21 and 22 along the pivot axis PIV.

In this figure, the device is shown open, so it is possible to insert a flexible tube into one of the notches providing the tube has the same diameter as the circular arcs.

Furthermore, it is possible to form a loop, thereby presenting two strands, so as to insert the first strand in the top notch of the top blade 21 and the second strand in the bottom notch of the same blade.

With reference to FIG. 3, the device is shown closed. There can clearly be seen the two circles that are formed by the two blades when their longitudinal axes are in alignment.

Each of these two circles serves to hold captive a respective strand of the loop. They must not be obstructed while closing the device, whence the shape of the notch projecting from the second circular arc ARC2.

Holder means 25 can also be seen for holding the flexible tube captive when it is fully wound. It may be a strap or a tape provided with a self-gripping strip. Ideally, it is fastened to the pivot axis PIV.

The above-described embodiment of the invention has been selected because of its concrete nature.

Nevertheless, it is not possible to list exhaustively all embodiments covered by the invention. In particular, any of the means described may be replaced by equivalent means without going beyond the ambit of the present invention.

The invention claimed is:

1. A device for winding a flexible tube, the device comprising two identical blades (LA, 21, 22) placed opposite ways round one against the other and pivotally secured to each other about their respective axes of axial symmetry, which together constitute a pivot axis (PIV), wherein:
    one of said blades (LA) presents in its left edge an upwardly open notch (EC) that is formed by a first circular arc (ARC1) having its origin at a connection point (PR) situated on the right edge of the notch and on the longitudinal axis (LG) of said blade;
    a diameter of said first circular arc lying on said longitudinal axis; and
    said first circular arc presenting a central angle (a) of not less than 180°; and
    wherein, when said device is opened such that the two blades are spaced apart, an opening between said blades and facing said notch incorporates a circle having said diameter.

2. A device according to claim 1, characterized in that said notch projects upwards from said connection point (PR) following a second circular arc (ARC2) having the same diameter as the first circular arc (ARC1) and tangential to the first circular arc at the connection point, the center of the second circular arc lying on said longitudinal axis (LG), to the right of said connection point.

3. A device according to claim 1, characterized in that the central angle (α) of said first circular arc (ARC1) lies in the range 180° to 230°.

4. A device according to claim 3, characterized in that said central angle (α) is equal to 225°.

5. A device according to claim 1, characterized in that a spacer is arranged on said pivot axis (PIV) between the two blades (21, 22).

6. A device according to claim 1, characterized in that holder means (25) are provided that are fastened to said pivot axis (PIV).

7. A device according to claim 1, characterized in that an abutment (23) is provided on one of said blades (LA, 21, 22), said abutment is perpendicular to the blade.

8. The device according to claim 1, wherein said notch projects upwards from said connection point following a second circular arc (ARC2) having a same diameter as the first circular arc (ARC1) and tangential to the first circular arc at the connection point, the center of the second circular arc lying on said longitudinal axis (LG).

9. A device for winding a flexible tube, the device comprising two identical blades (LA, 21, 22) placed opposite ways round one against the other and pivotally secured to each other at a symmetrical pivot axis;
    wherein each of said blades comprises at one end an open notch (EC) formed by a first circular arc (ARC1) originating at a connection point (PR) located on an edge of the notch closest to the pivot axis and on a longitudinal axis (LG) of said blade;
    wherein a diameter of said first circular arc lies on said longitudinal axis;
    wherein said first circular arc presents a central angle (α) of not less than 180°; and
    wherein, when said device is opened such that the two blades are spaced apart, an opening between opposing distal ends of said two blades is at least as large as said diameter.

10. The device according to claim 9, wherein a spacer is arranged on said pivot axis (PIV) between the two blades (21, 22).

* * * * *